Sept. 27, 1949.　　　　M. P. MACK　　　　2,483,058

VEHICLE SIGNAL ATTACHMENT

Filed June 8, 1948

Inventor

Mathew P. Mack

By *Clarence A. O'Brien and Harvey B. Jacobson*
Attorneys

Patented Sept. 27, 1949

2,483,058

UNITED STATES PATENT OFFICE 2,483,058

VEHICLE SIGNAL ATTACHMENT

Mathew P. Mack, Watertown, S. Dak.

Application June 8, 1948, Serial No. 31,712

1 Claim. (Cl. 177—329)

This invention relates to new and useful improvements in signal devices and the primary object of the present invention is to provide a signal attachment for vehicles which will indicate that a vehicle is parked adjacent a roadway for repair so that an approaching vehicle may pass the same safely without causing an accident.

Another important object of the present invention is to provide an attachment for the roof of a vehicle on the left hand side thereof and which is electrically connected to the electrical circuit of a vehicle to be quickly and readily energized by an auxiliary or independent switch to indicate to approaching motorists that a vehicle is parked on a roadway so that the said approaching vehicle may pass in a slow and cautious manner.

A further object of the present invention is to provide an electrical signal for vehicles that is quickly and readily applied to or removed from the roof of a vehicle and which is extremely small and compact in structure to facilitate the convenient transportation or storage of the same in a desirable manner.

A still further aim of the present invention is to provide a signal attachment for the roof of a vehicle that is strong and durable in use, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
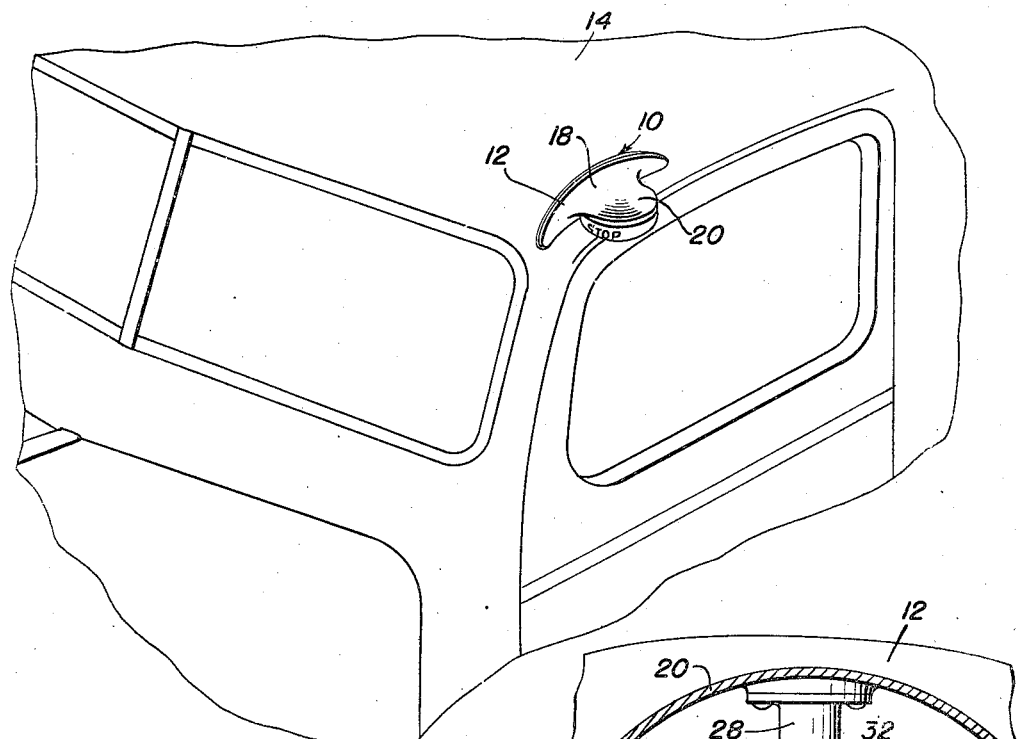
Figure 1 is a fragmentary perspective view of the present invention and showing the same applied to the rooof of a vehicle.
Figure 3:
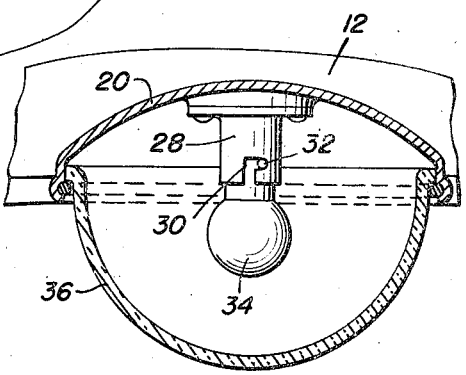
Figure 2:
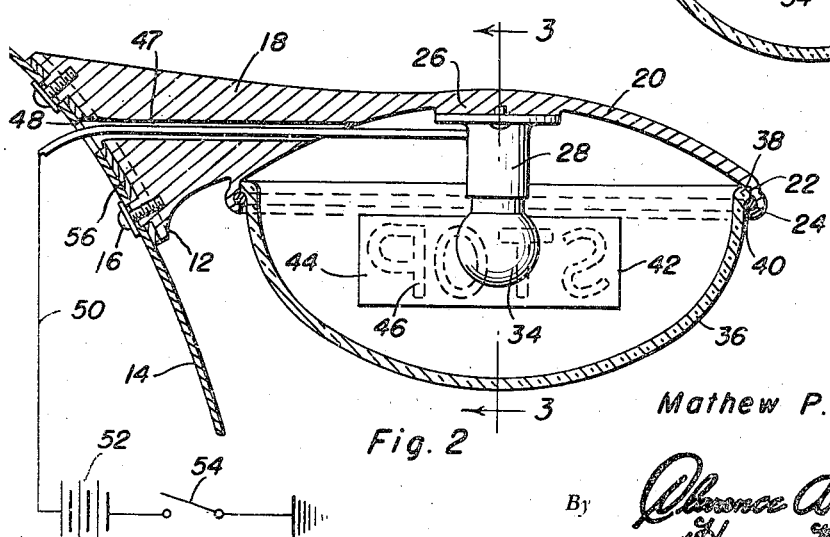
Figure 2 is a longitudinal vertical sectional view of the present signal attachment and showing the manner in which the same is electrically connected to the electrical circuit of a vehicle; and, Figure 3 is a transverse vertical view taken substantially on the plane of section line 3—3 of Figure 2.

Referring now to the drawings in detail, wherein for the purpose of illustration, there is disclosed a preferred embodiment of the present invention, the numeral 10 represents the present signal light generally, which includes an anchor plate 12 that is rigidly secured or removably secured to the roof 14 of a vehicle by rivets, fasteners or the like 16.

Rigidly secured to or forming an integral part of the anchor plate 12, is an outwardly projecting, substantially horizontally disposed arm shield or bracket 18 the outer extremity of which is integrally formed with a concavo-convexed closure plate or cover 20 the concaved surface of which faces downwardly. The cover 20 is formed with a depending annular flanged portion 22 the lower portion of which is depressed to form an annular seat 24.

Secured to a central hub or protuberance 26 formed on the inner concaved face of the cover 20, is the base portion of a lamp holding socket 28 that is formed with a bayonet slot 30 for lockingly engaging an outwardly projecting lug 32 carried by a lamp bulb 34.

The numeral 36 represents a concavo-convexed casing or translucent housing the upper open end of which is formed with an annular beading 38 that engages and bears against the inner face of the flanged portion 22. This casing 36 is retained in position relative to the cover 20 by an annular preferably split ring 40 that is positioned in the annular seat 24. It is preferred, that the casing 36 be constructed of a translucent amber material, such as plastic or the like, which will be clearly visible at a great distance and which is commonly accepted as a warning signal to approaching motorists.

Diametrically opposite sides of the casing 36 are provided with substantially rectangular openings 42 that register with indicia bearing cords or strips 44 having preferably the word "stop" printed or formed thereon. It being understood, that both the strips 44 are of an opaque material so that light will not pass through the same, however, the indicia 46 provided on the strips 44 are transparent or translucent so that the light rays eminated from the light blub 34 will pass through the indicia 46 to indicate to an approaching motorist that the vehicle on which the present attachment is applied is parked or stopped on the roadway. Leading from the socket 28, and extending through a bore 47 provided in the support arm 18 and an aperture 48 provided in the roof 14, is a pair of conductive wires 50 which are electrically connected to the electrical circuit of the vehicle or more particularly the battery 52 thereof. These wires are controlled by a switch 54 which is preferably mounted on the dash board or panel of the vehicle.

In practical use of the present invention, it is preferred that a resilient pad or cushion 56 be interposed between the anchor plate 12 and the roof 14 to prevent harmful boring of the said roof 14. When the vehicle on which the present signal light is applied is part adjacent a roadway or on the roadway, the switch 54 is conveniently actuated to energize the lamp bulb 34 and the light rays emitted from the lamp 34 will pass through the amber and translucent casing 36 as well as the indicia 46 to indicate to approaching motorists that the vehicle is parked on the roadway or adjacent the roadway.

Obviously, with the use of the present signal light or indicator, approaching motorists will be warned sufficiently before they approach the parked vehicle when the same is stopped for repair or for parking on the roadway, and thus unnecessary accidents will be avoided usually occurring since approaching motorists do not have the necessary time to apply their brakes or to slow the vehicle before reaching a poorly visible parked vehicle. Since the strips 44 apply both to the forward and rear portions of the casing, both sides of the traffic, namely, that approaching the forward portion of the parked vehicle and that approaching the rear portion of the parked vehicle will be amply notified in time to slow their vehicle and pass the parked vehicle in a safe manner.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

In a vehicle having a fixed roof structure, a signal attachment to approaching vehicle operators for indicating that the vehicle is parked adjacent a roadway for repair, said attachment comprising an anchor plate removably secured to the roof structure and above the driver's door of the vehicle, a concavo-convexed cover plate integrally formed with the anchor plate and projecting laterally therefrom, said cover plate being disposed in a substantially horizontal plane and having a depending annular flanged portion, an annular groove provided in the inner surface of said flanged portion, a concavo-convexed translucent casing having an outwardly flared edge embraced by said flanged portion, a split ring received in said groove and bearing against the outwardly flared edge of said casing to support the casing relative to the cover plate, a central protuberance integrally with the concaved surface of said cover plate, a lamp supporting socket fixed to said protuberance, said casing having a pair of diametrically disposed openings therein, and strips fixed within said cover plate and having translucent indicia thereon, said roof having an opening and a further opening provided in said anchor plate and said closure in registry with the opening in said roof for receiving conductive wires for said lamp holding base.

MATHEW P. MACK.

REFERENCES CITED

The following references are of record in the file of this patent:

UNITED STATES PATENTS

| Number | Name | Date |
|---|---|---|
| 1,193,519 | Crownfield | Aug. 8, 1916 |
| 1,200,460 | Booraem | Oct. 10, 1916 |
| 1,376,710 | Law | May 3, 1921 |